United States Patent [19]
Wagner

[11] Patent Number: 6,029,932
[45] Date of Patent: Feb. 29, 2000

[54] DETONATING VALVE FOR RELEASING OPENINGS OF AIR BAG LANDING SYSTEMS

[75] Inventor: Adalbert Wagner, Radthal, Germany

[73] Assignee: DaimlerChrysler AG, Ottobrunn, Germany

[21] Appl. No.: 09/032,281

[22] Filed: Feb. 27, 1998

[30]    Foreign Application Priority Data

Feb. 28, 1997 [DE] Germany ............................ 197 08 158

[51] Int. Cl.⁷ .................................................. B64C 25/00
[52] U.S. Cl. ................................... 244/100 A; 244/138 R
[58] Field of Search ............................. 102/378; 89/1.14; 244/100 A, 138 R; 280/739

[56]    References Cited

U.S. PATENT DOCUMENTS

| | | | |
|---|---|---|---|
| 2,712,913 | 7/1955 | Stanley ................................. | 244/138 R |
| 3,266,757 | 8/1966 | Guienne ............................... | 244/138 R |
| 3,884,499 | 5/1975 | Oka et al. ............................. | 280/739 |
| 5,577,689 | 11/1996 | Haro .................................... | 244/138 R |
| 5,704,639 | 1/1998 | Cundill et al. ....................... | 280/739 |
| 5,725,244 | 3/1998 | Cundill ................................ | 280/739 |
| 5,853,192 | 12/1998 | Sikorski et al. ..................... | 280/739 |

FOREIGN PATENT DOCUMENTS

| | | |
|---|---|---|
| 24 27 790 C2 | 2/1983 | Germany . |
| 195 31 294 C1 | 8/1996 | Germany . |

*Primary Examiner*—Peter M. Poon
*Assistant Examiner*—Charles R. Ducker, Jr.
*Attorney, Agent, or Firm*—McGlew and Tuttle, P.C.

[57]    ABSTRACT

The detonating valve for releasing openings of air bag landing systems for aircraft and spacecraft has a wedge type charge and a cover closing the opening, which cover is shorn off during the ignition of the wedge type charge. The cover is a thin-walled disk or a membrane, which is integrated either within the aircraft and spacecraft or within the air bag landing system.

9 Claims, 2 Drawing Sheets

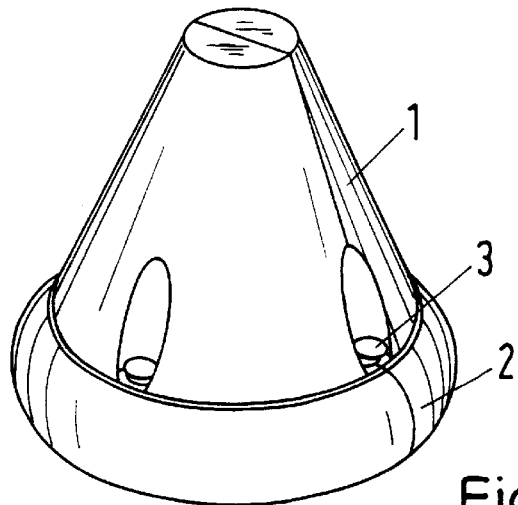
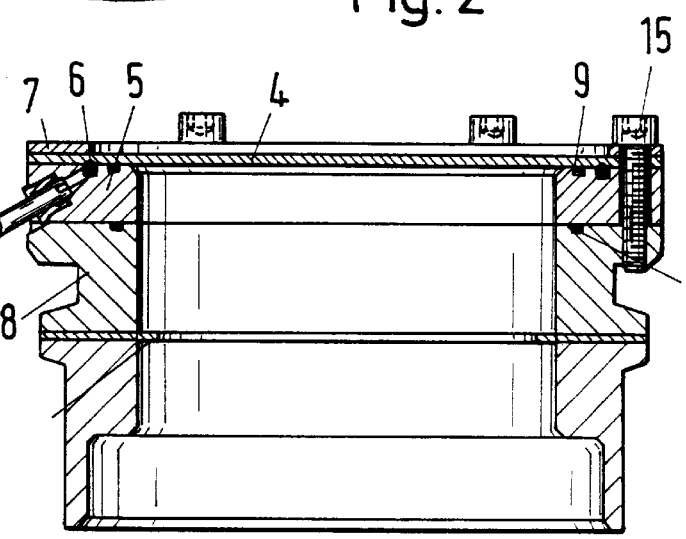
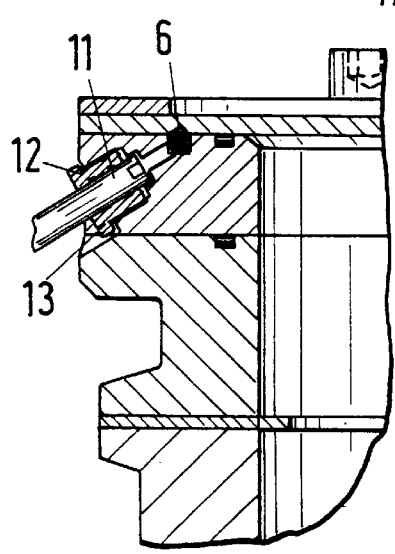
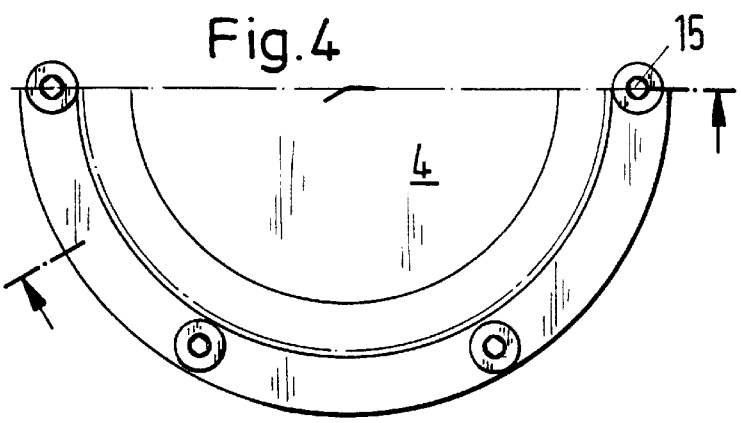

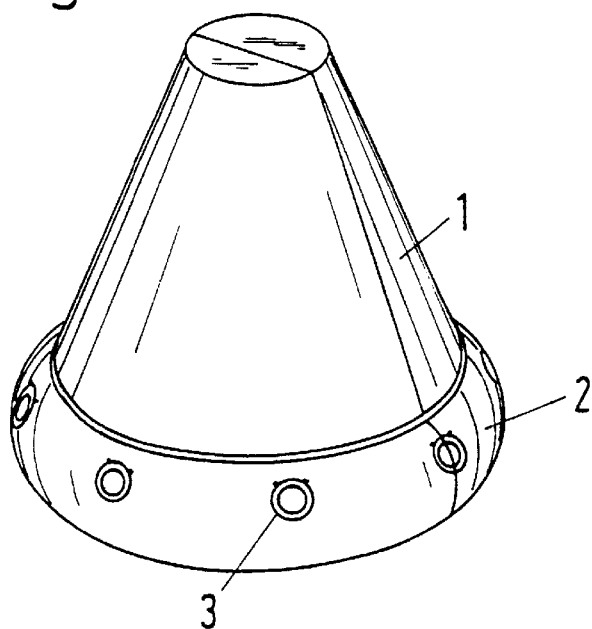
Fig. 5
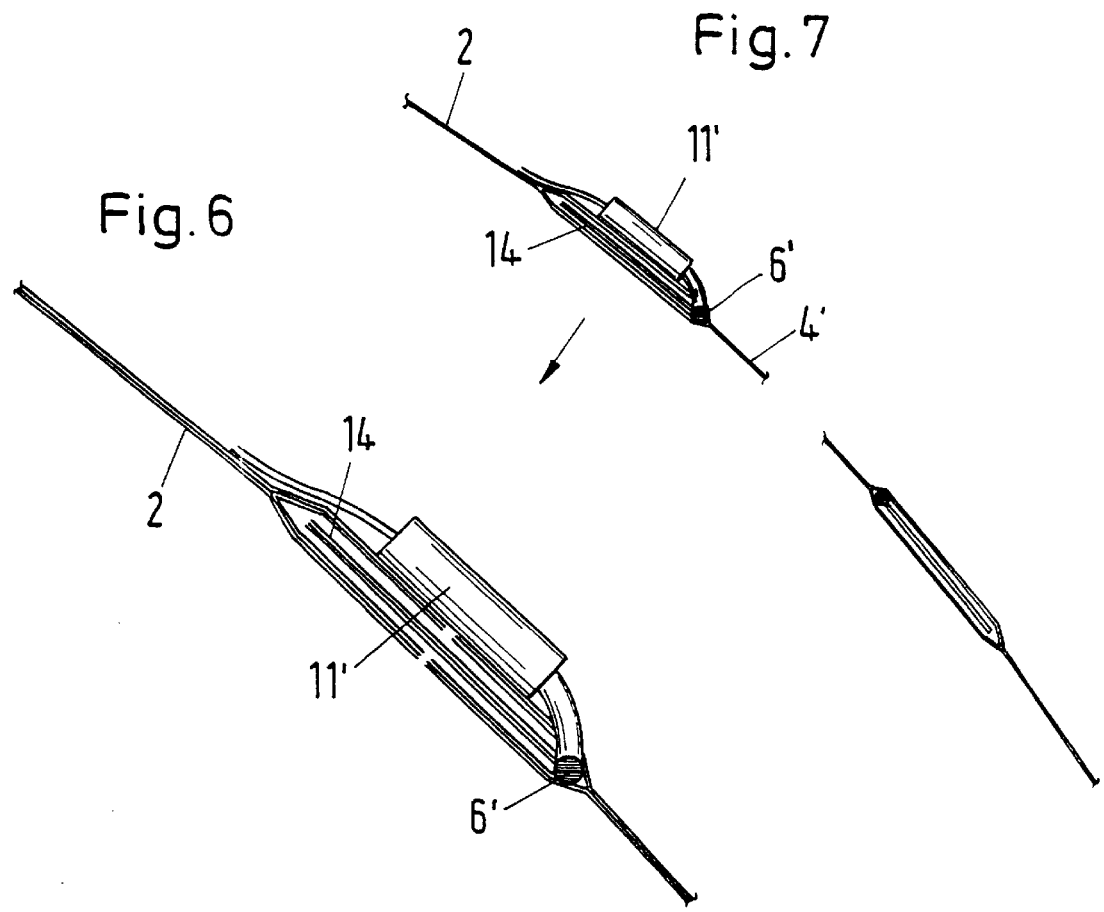
Fig. 6
Fig. 7

DETONATING VALVE FOR RELEASING OPENINGS OF AIR BAG LANDING SYSTEMS

FIELD OF THE INVENTION

The present invention pertains to a detonating valve for releasing openings of air bag landing systems for aircraft and spacecraft, comprising a wedge type charge with igniter and a cover covering the opening, which is shorn off during the ignition of the wedge type charge.

BACKGROUND OF THE INVENTION

Such air bag landing systems are used during the landing of loads jettisoned from airplanes, such as pallets, missiles, drones, etc., by means of parachutes or paragliders, as well as during the landing of spacecraft, such as capsules and the like. The air bag landing system has the task of decelerating the aircraft or spacecraft within defined preset maximum deceleration values. Precise release of the openings used for discharge from the air bag landing system is necessary during the relatively short decelerating or damping time during landing, i.e., during the impact on the ground, which is about 0.1 to 0.2 sec. It is even often desirable to release the openings used for the discharge at a defined point in time within a few msec.

Because of the large amount of gases being discharged, e.g., air, which may reach about 14 $m^3$ in the case of capsules with landing weights of up to 7 tons, the openings are required to have relatively large cross sections (e.g., diameters of up to 400 mm in the case of 8 chambers).

DE-C-24 27 790 discloses a release valve for pressurized tanks, which can be triggered by an explosive force and is used, e.g., in fire-extinguishing devices to allow a medium that is under high pressure in a container to be suddenly discharged, e.g., to extinguish an explosion flame. The release valve has a bursting disk, which covers the opening and is provided with an explosive-filled annular groove surrounding its middle area, wherein the bursting disk has a second annular groove, and the two annular grooves are arranged in one of the two faces of the bursting disk at radially so closely spaced locations from one another that they define between them a ring wall area oriented essentially at right angles to the faces of the bursting disk, and the thickness of this ring wall area is smaller than the plate thickness. Radial shearing off of the ring wall area is thus made possible by using a small amount of explosive in the case of triggering.

DE-C-195 31 294 describes a pressurized container with at least one discharge opening for the pressurized medium being stored, a closing member as well as pyrotechnic means for opening the closing member, wherein a propellant charge for generating bursting pressure with associated igniting means is located between a bursting membrane blocking the opening cross section and a perforated plate arranged at a spaced location in front of the bursting membrane when viewed in the direction of discharge, and wherein a space is provided between the propellant charge and the perforated plate for a disk movable in the direction of the normal to the plate for closing the holes in the plate during the buildup of the bursting pressure.

SUMMARY AND OBJECTS OF THE INVENTION

The object of the present invention is to provide a detonating valve for releasing openings of air bag landing systems for aircraft and spacecraft, wherein the openings are released in the conventional manner by a wedge type charge provided with an igniter, which valve offers a high level of reliability with a small design effort, with which rapid release in the msec range is made possible, in which the point in time of the triggering can be set with certainty, and in which an axial release of the cross section is guaranteed.

According to the invention, a detonating valve for releasing openings of air bag landing systems for aircraft and spacecraft is provided, comprising a wedge type charge with igniter and a cover closing the opening, which cover is shorn off during the ignition of the wedge type charge. The cover is a thin-walled disk. A second igniter is associated with the wedge type charge. The igniters and the wedge type charge are arranged in a mounting ring, which is in contact with the disk to be shorn off. A support ring, which limits the cutting point and surrounds the disk to be shorn off, is provided on the side of the disk to be shorn off, which side faces away from the mounting ring. The side of the mounting ring facing away from the disk to be shorn off is in contact with an adapter. A diaphragm limiting the diameter of the opening is provided on the side of the adapter facing away from the mounting ring.

According to another aspect of the invention, a detonating valve is provided for releasing openings of air bag landing systems for aircraft and spacecraft, comprising a wedge type charge with igniter and a cover closing the opening, which cover is shorn off during the ignition of the wedge type charge. A second igniter is associated with the wedge type charge. A disk of a flexible membrane is provided. The membrane is limited by an edge reinforcement surrounding same. The two igniters are arranged on the outside of the edge reinforcement. The wedge type charge is welded into the edge reinforcement at the connection point between the membrane and the edge reinforcement.

The detonating valve according to the present invention for actuating an air bag landing system for aircraft and spacecraft makes it possible to blast off the cover axially in the direction of discharge of the gas used to inflate the air bag landing system, as a result of which the cover is thrown off to the outside due to the detonating action, rather than being accelerated only by the discharge of the gases. This leads to a more rapid release of the cross section of the opening. This is especially advantageous, because only small differences in pressure are present.

Furthermore, the probability that individual destroyed parts of the cover are caught in the discharge cross section of the released opening is reduced, because the cover is located on the outside.

The cover itself, in the form of a thin-walled disk or a flexible membrane, may be made to be substantially lighter and thinner, because it is destroyed axially rather than radially. As a result, the detonating valve is less complicated and has a lower weight.

Damage to the components surrounding the detonating valve due to the detonation itself is ruled out by the axial direction of action, because the detonating action and a possible contamination are directed to the outside.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of a spacecraft with detonating valve according to the present invention integrated in it, as well as an air bag landing system;

FIG. 2 is an enlarged sectional view of the arrangement of the detonating valve;

FIG. 3 is part of the sectional view from FIG. 2;

FIG. 4 is a partial top view of a detonating valve;

FIG. 5 is a perspecive view of a spacecraft with the corresponding air bag landing system and detonating valves integrated in it; and FIG. 6 is an enlarged sectional view through a detonating valve, which is integrated in the air bag landing system FIG. 7 is an enlarged sectional view through a detonating valve, which is integrated in the air bag landing system.

DESCRIPTION OF THE PREFERRED EMBODIMENT

Referring to the drawings and in particular to FIG. 1, a spacecraft, e.g., a capsule 1, is provided with an air bag landing system 2. The air bag landing system 2 can be inflated during landing. This, as a result, dampens the impact on the ground. A plurality of detonating valves 3 are designed according to the present invention to ensure that the air bag landing system 2 can be ventilated at an exactly determined point in time through the individual detonating valves 3. The detonating valves 3 are provided at the connection point between the air bag landing system 2 and the capsule 1.

The detonating valves 3 are rigidly connected to the capsule. The detonating valves 3 are actuated by pressure sensors or distance sensors (not shown), wherein the pressure sensors bring about opening immediately after the impact and the distance sensors bring about opening immediately before the impact. According to the exemplary embodiment shown in FIGS. 1 through 4, the cover 4 of each detonating valve 3 is a thin-walled disk, along the circumference of which a wedge type charge 6 in the form of a detonating cord is arranged. Two igniters 11 are associated with each detonating cord for reasons of redundancy. The igniters 11 and the wedge type charge 6 are arranged in a mounting ring 5, which is directly in contact with the thin-walled disk 4 to be shorn off and is used as a bracket for the igniter 11, the detonating cord 6 and the seals 9. Furthermore, a support ring 7, which limits the cutting point, is provided on the side of the disk 4 to be shorn off, which side faces away from the mounting ring 5, while an adapter 8 is in contact on the side of the mounting ring 5 facing away from the disk 4. The adapter 8 is used to mount the detonating valve on existing flange systems and as a buffer between the consumed parts destroyed by the detonation and the flange proper with an optionally adjustable diaphragm, which remains intact after the separation of the detonating valve.

The wedge type charge used to cut the disk 4 with the two igniters may be made of commercially available components. The disk 4 to be shorn off by the detonating cord 6, which disk seals the opening to the outside against the ambient pressure, may consist of, e.g., aluminum, but also of plastic, e.g., PVC, PTFE, glass fiber-reinforced plastics, or carbon fiber-reinforced plastics, wherein the score provided as a predetermined breaking point is not always necessary; this depends on the material used, the pressure load under internal pressure, the thickness of the disk, and the explosive force of the wedge type charge.

The mounting ring 5, which carries the igniters 11, the wedge type charge and optionally seals, advantageously consists of an aluminum alloy, and the igniter 11 is inserted by means of a suitable screw connection 12 and the corresponding seals 13 (FIG. 3). Finally, screw connections which hold together the detonating valve 3 are designated by 15.

In the exemplary embodiment shown in FIGS. 5 through 7, the detonating valve 3 designed according to the present invention is integrated in the air bag landing system 2 rather than in the capsule 1. A plurality of detonating valves 3 (FIG. 5) are provided here as well. The detonating valves 3 are in connection with individual air bag chambers in order to ventilate the air bag landing system during the landing of the aircraft or spacecraft 1.

FIGS. 6 and 7 show that the cover 4' may be formed of a preferably flexible membrane, which is limited by an edge reinforcement 14 surrounding same. Two igniters 11', which are, e.g., bonded, are provided for each detonating valve on the outside of the edge reinforcement 14. The wedge type charge 6' in the form of a detonating cord is arranged at the connection point between the edge reinforcement 14 and the flexible membrane 4' and is preferably welded or bonded into the edge reinforcement.

The rigidly installed detonating valve in this exemplary embodiment is suitable for ground tests and for avionic hardware alike because of its inexpensive replacement parts. Even though the replacement of fabric parts of the landing system after opening of the valve is more complicated and expensive in the case of the detonating valve 3 integrated in the air bag landing system 2, this exemplary embodiment requires a considerably lower weight, and it is therefore especially suitable for use during long flights.

Unlike in the case of the exemplary embodiment according to FIGS. 1 through 4, the wedge type charge bonded into the edge reinforcement 14 is not supported on a fixed flange, but it acts freely on the surface of the membrane 4'. As a result, the fabric of the membrane 4' is cut because of the specific explosion along the wedge type charge, and the desired opening is released. The two igniters per detonating valve may be arranged not only on the outside but also on the inside next to the wedge type charge 6' or be bonded to the landing system.

The thin membrane 4' contains the predetermined breaking point and the wedge type charge of the valve and limits the action of the explosive charge on the cross section of the opening because of the circumferential edge reinforcement 14. Different discharge cross sections can be obtained by mounting opening valves with different diameters.

It is true of both exemplary embodiments that the air bag landing system is equipped with a plurality of detonating valves, which can be opened especially at the same time and within the msec range. Swaying or tilting of the aircraft or spacecraft after landing shall be prevented from occurring for reasons of stability, so that not all detonating valves shall be opened at the same time, and only certain detonating valves shall be opened, depending on the direction of impact. The active opening mechanism provided, using pressure sensors and/or distance sensors, ensures the opening of the individual detonating valves at the correct time.

While specific embodiments of the invention have been shown and described in detail to illustrate the application of the principles of the invention, it will be understood that the invention may be embodied otherwise without departing from such principles.

What is claimed is:

1. A detonating valve for releasing openings of air bag landing systems for aircraft and spacecraft, comprising:
   a wedge type charge;
   an igniter;
   a cover closing the opening, the cover being shorn off during the ignition of the wedge type charge, said cover cover being a thin-walled disk;
   another igniter associated with said wedge type charge, said the igniter and said another igniter and the wedge type charge being arranged in a mounting ring, said mounting ring being in contact with the disk to be shorn off;
   a support ring, which limits a cutting point and surrounds the disk to be shorn off, provided on a side of said disk, said side of said disk facing away from said mounting ring, a side of said mounting ring facing away from the disk to be shorn off being in contact with an adapter; and
   a diaphragm limiting the diameter of the opening provided on a side of the adapter facing away from the mounting ring.

2. The detonating valve in accordance with claim 1, wherein said wedge type charge is a detonating cord, which is placed partly into a groove in said mounting ring and partly into a corresponding groove in the disk.

3. The detonating valve in accordance with claim 1, wherein the diameter of said diaphragm is adjustable.

4. The detonating valve in accordance with claim 2, wherein the diameter of said diaphragm is adjustable.

5. The detonating valve in accordance with claim 1, further comprising at least one of pressure sensors and distance sensors which trigger the igniters, associated with said detonating valve.

6. The detonating valve in accordance with claim 2, further comprising at least one of pressure sensors and distance sensors which trigger the igniters, associated with said detonating valve.

7. A detonating valve for releasing openings of air bag landing systems for aircraft and spacecraft, comprising:
   a wedge type charge;
   an igniter;
   a cover closing a valve opening, which cover is shorn off during the ignition of the wedge type charge;
   another igniter associated with the wedge type charge;
   a disk comprising a flexible membrane;
   an edge reinforcement, said membrane being limited by said edge reinforcement surrounding said membrane said igniter and said another igniter being arranged on an outside of said edge reinforcement; and
   wherein a wedge type charge is welded into said edge reinforcement at the connection point between said membrane and said edge reinforcement.

8. The detonating valve in accordance with claim 7, wherein said wedge type charge is a detonating cord.

9. The detonating valve in accordance with claim 7, further comprising at least one of pressure sensors and distance sensors, which trigger the igniters.

* * * * *